United States Patent
Hill et al.

(10) Patent No.: US 6,228,334 B1
(45) Date of Patent: May 8, 2001

(54) METHOD OF RECOVERING GOLD FROM THE FINE CARBON RESIDUE FROM A COARSE CARBON GOLD RECOVERY PROCESS

(76) Inventors: Eric M. Hill, P.O. Box 10473, Fairbanks, AK (US) 99710; Hsing Kuang Lin, 2143 Bridgewater Dr., Fairbanks, AK (US) 99709-4104

( * ) Notice: Subject to any disclaimer, the term of this patent is extended or adjusted under 35 U.S.C. 154(b) by 0 days.

(21) Appl. No.: 09/470,313

(22) Filed: Dec. 21, 1999

(51) Int. Cl.[7] .............................. B01D 15/00; C22B 11/00
(52) U.S. Cl. ................... 423/25; 423/27; 423/29; 423/41
(58) Field of Search .................... 423/25, 27, 29, 423/41; 502/25, 416; 75/711, 712, 736, 737, 744

(56) References Cited

U.S. PATENT DOCUMENTS

| | | | |
|---|---|---|---|
| 4,528,166 | * | 7/1985 | McDougall ............................. 423/25 |
| 4,981,598 | * | 1/1991 | Komadina .............................. 423/25 |
| 5,019,162 | * | 5/1991 | Suzuki et al. .......................... 423/29 |

FOREIGN PATENT DOCUMENTS

| | | | |
|---|---|---|---|
| 647074 | * | 8/1991 | (AU) ...................................... 423/29 |
| 139056 | * | 5/1985 | (EP) ...................................... 423/25 |
| 177293 | * | 4/1986 | (EP) ...................................... 423/25 |

OTHER PUBLICATIONS

Zadra, J.B., "A Process for the recovery of gold from activated carbon by leaching and electrolysis," Bureau of Mines Report 4672, Apr. 1950.*

D. Seymour, Carbon consumption in Precious Metal Recovery—An Industry Survey, Randol Proceedings, pp319–326, Vancouver, Canada, 1992, no month.

Rescan Engineering Ltd., World gold Survey, Section 4, May 1998.

* cited by examiner

Primary Examiner—Steven Bos
(74) Attorney, Agent, or Firm—R. Russel Austin

(57) ABSTRACT

A method for recovering gold from gold-loaded fine carbon residue from a coarse carbon gold recovery process is disclosed. The gold-loaded fine carbon residue is mixed with activated coarse carbon and an aqueous solution of a transfer reagent to form a slurry. In the slurry the reagent promotes transfer of gold from the fine carbon to the coarse carbon. After allowing time for the transfer, gold-loaded coarse carbon is separated from the slurry. Gold can then be recovered from the separated coarse carbon, for example by cyanide leaching followed by electrowinning. More gold can be recovered by adding further coarse carbon and repeating the transfer of gold to that coarse carbon. In one example 66% of gold was transferred from the fine carbon to the coarse carbon in one transfer cycle. About 89% and 96% of gold can be recovered after respectively second and third transfer cycles.

14 Claims, 1 Drawing Sheet

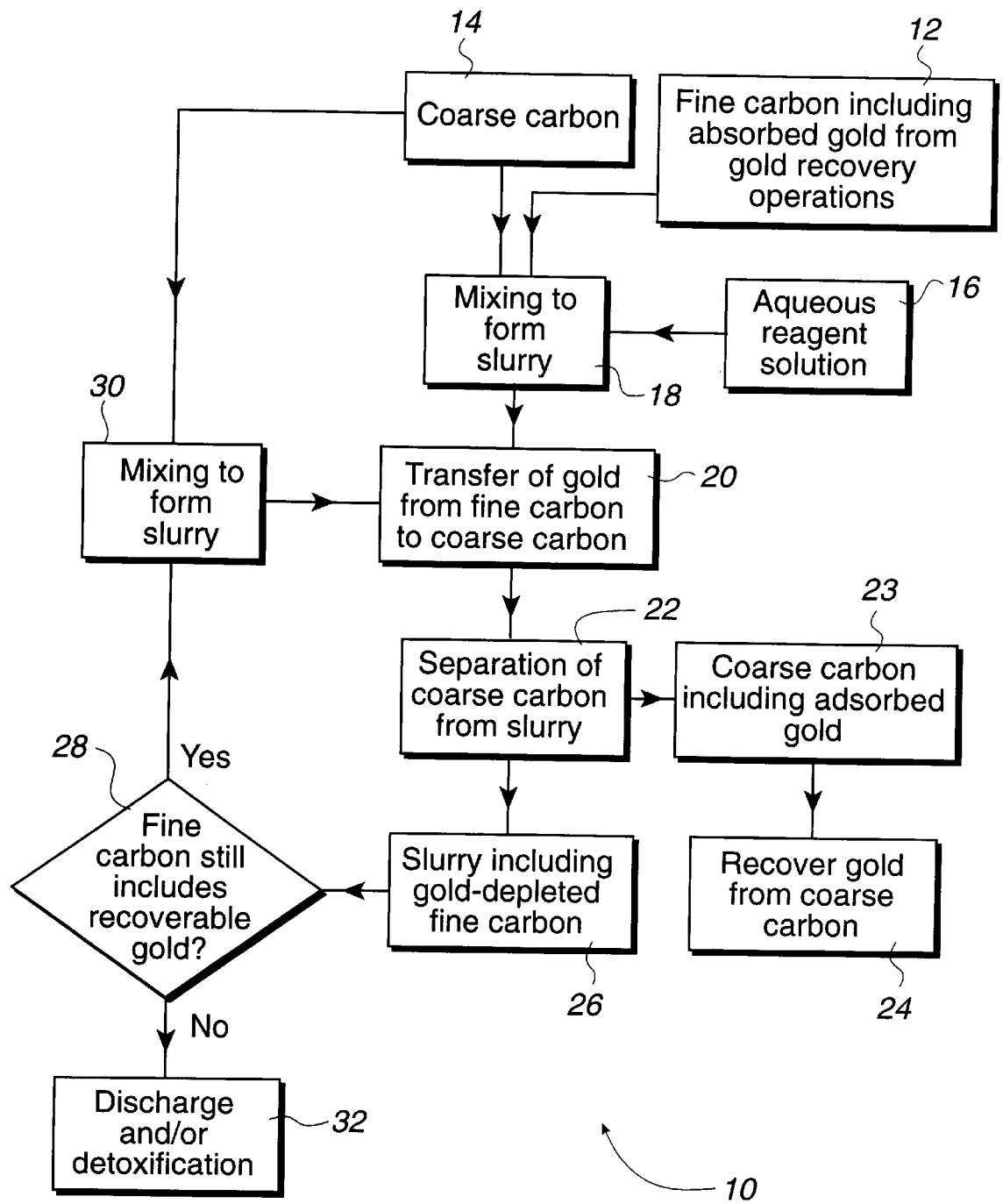

METHOD OF RECOVERING GOLD FROM THE FINE CARBON RESIDUE FROM A COARSE CARBON GOLD RECOVERY PROCESS

TECHNICAL FIELD OF THE INVENTION

The present invention relates in general to methods of gold recovery. The invention relates in particular to a method of recovering gold from fine carbon residue produced during a process in which gold is recovered from its ores by leaching and absorption onto coarse activated carbon.

DISCUSSION OF BACKGROUND ART

Activated carbon is widely used for recovering precious metals including gold and silver, throughout the precious metals industry. In one generally preferred prior-art gold recovery method, a reagent solution of potassium or sodium cyanide or some other chemical is used to dissolve a precious metal from its ores. Coarse carbon, for example, about 20-mesh or greater, is added to the gold-containing solution so formed. The dissolved precious metal can be effectively adsorbed on to the coarse carbon. The coarse carbon is then separated from the solution by passing the mixture of carbon and solution through 20-mesh screens.

The gold is then stripped from the gold-loaded carbon with a further reagent solution of sodium or potassium cyanide to form a second gold-containing solution. The gold is then generally recovered from the solution by an electrochemical process such as electrowinning.

One disadvantage of this carbon adsorption method is a loss of carbon, and gold adsorbed thereon, during the various steps of the process. This loss occurs as a result of a percentage of coarse carbon being reduced to fine carbon particles, for example less than about 20 mesh, during the above-described process steps. The particles are sufficiently fine that they can not be retained by the 20-mesh screens typically used for carbon separation. Because of this the fine carbon may be deposited in the tailing along with the adsorbed gold. A global survey of 36 selected gold producing companies indicated that the average carbon consumption in this process was 0.025 pound per ton of processed ore (D. Seymour, Carbon consumption in Precious Metal Recovery—An Industry Survey, Randol Proceedings, pp319–326, Vancouver, Canada, 1992). Yearly carbon consumption at the 36 mines surveyed is approximately 2,000 tons. This carbon can contain from about 4 to 50 ounces (oz) of gold per ton.

Due to the potential loss of gold on the fine carbon, most precious metal producing companies employ some method, for example, flocculation and filtration, to recover at least a part of the residual fine carbon generated during the process steps. In one industry standard procedure, once sufficient fine carbon has been recovered, the recovered fine carbon is shipped off site to be processed (Rescan Engineering LTD., World gold Survey, Section 4, May 1998) for recovery of any precious metal adsorbed thereon. The typical off-site process includes grinding and smelting the fine carbon, followed by recovering precious metals from the ash with further stages of cyanide dissolution and electrowinning.

The average cost of shipping and processing of the fine carbon can be sufficiently high that about five to six ounces of gold must be recovered per ton of fine carbon for the recovery process simply to break even. Clearly, there is a need for a simple and inexpensive on-site process for recovering precious metals from the fine carbon produced during the coarse carbon process for precious metal recovery.

SUMMARY OF THE INVENTION

The present invention is based on a discovery that gold can be transferred from gold-loaded fine carbon to coarse carbon in a slurry containing a suitable transfer reagent. This permits that gold can be recovered from fine carbon residue from a prior-art coarse carbon recovery process at the prior-art process site without the expensive grinding and smelting steps of prior-art methods for recovering gold from fine carbon residues.

In one aspect the method of the present invention comprises mixing the gold-loaded fine carbon residue with coarse carbon and an aqueous solution of a transfer reagent to form a coarse-carbon-containing slurry. The coarse carbon is retained in the first slurry for a time period sufficient that gold is transferred from the gold-loaded fine carbon to the coarse carbon, whereby the coarse-carbon becomes gold-loaded and the fine carbon becomes gold-depleted. The gold-loaded coarse carbon is separated from the coarse-carbon-containing slurry, thereby leaving a coarse-carbon-free slurry including gold-depleted fine carbon. The transferred gold is recovered from the gold-loaded coarse carbon.

The transfer reagent solution preferably includes one or more reagents selected from the group of reagents consisting of potassium cyanide, sodium cyanide, potassium sulfite, sodium sulfite, potassium thiosulfate, sodium thiosulfate, and thiourea. Potassium and sodium cyanide in a concentration of about 0.01% or greater have been found particularly effective.

Transfer of gold from the gold-loaded fine carbon to the coarse carbon progressively decreases as the gold content of the fine and coarse carbon become equal. Transfer thus becomes more effective the higher the coarse carbon to fine carbon ratio in the coarse-carbon-containing slurry. More gold can be transferred from the gold-depleted carbon in the coarse-carbon-free slurry by further addition of coarse carbon thereto and repetition of the above described transfer and separation stages.

In one example, wherein 1% solution of sodium cyanide was used as a transfer reagent solution and the coarse carbon to fine carbon ratio was about 1/1, 66% of gold was transferred from the fine carbon to the coarse carbon in 7 hours in a single cycle of the inventive gold recovery method. About 89% and 96% or gold could be transferred from the fine carbon to coarse carbon in respectively second and third cycles (repetitions) of the inventive gold recovery method.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain the principles of the invention.

The FIGURE is a flow chart schematically illustrating a preferred embodiment of the method of the present invention for recovering gold from fine carbon residue of a coarse-carbon gold-recovery process.

DETAILED DESCRIPTION OF THE INVENTION

Referring now to THE FIGURE the method of the present is described in detail with reference to flow-chart 10. Fine carbon recovered from gold producing operations (box 12), coarse carbon (box 14) and an aqueous reagent solution (box 16) are mixed (box 18) to form a slurry. As noted above fine carbon from gold producing operations often is typically collected by flocculation and filtration and contains four or more ounces of gold per ton of the fine carbon.

The coarse carbon is preferably coarser than 0.6 mm maximum cross-section dimension. The coarse carbon to fine carbon ratio in the mixing stage (box 18) is preferably between about 1:2 and 25:1. It should be noted here that coarse carbon as discussed herein is preferably activated coarse carbon.

The aqueous reagent solution is selected to promote transfer of gold from the fine carbon to the coarse carbon. As such the reagent solution my be described as a transfer reagent solution. Preferred transfer reagents include sodium cyanide, potassium cyanide, thiourea, sodium sulfite, potassium sulfite, sodium thiosulfate and potassium thiosulfate. This list of reagents, however, should not be considered limiting. Those skilled in the art may select other transfer reagents without departing from the spirit and scope of the present invention.

Sodium and potassium cyanides are believed to provide most effective transfer of gold from the fine carbon the coarse carbon. While both are about equally effective sodium cyanide is preferred as it is less expensive. A preferred aqueous solution of sodium or potassium cyanide contains greater than 0.01% cyanide and more preferably contains between about 0.1 and 0.5%. A preferred pH for an aqueous cyanide solution is between about 7 and 14.

A preferred aqueous solution of sodium or potassium thiosulfate and/or sulfite preferably contains between about 0.01 and 1.0% thiosulfate and/or sulfite. A preferred pH for the aqueous thiosulfate/sulfite solution is preferably between about 1 and 13.

A preferred aqueous solution of thiourea preferably contains between about 0.01 and 2.0% thiourea. The pH of the thiourea aqueous solution between about 0.1 and 7.0. Solution pH values can be controlled if desired by addition of an acid, for example sulfuric acid $H_2SO_4$, or a base such as lime CaO.

Preferably the slurry formed in the mixing operation is continually agitated while gold is transferred from the fine carbon to the coarse carbon (box 20). The slurry is preferably maintained at a temperature between about 5° C. and 98° C. A temperature of about 25° C. has been found suitable. A transfer time of between about 4 and 6 hours has been found to be effective when the transfer reagent solution is a cyanide solution. At end of the mixing, part of the precious metals on the fine carbon has been transferred to the coarse carbon (box 20). It is believed that transfer of gold from the fine carbon to the coarse carbon effectively stops when the gold-loading of the fine and coarse carbons is the same.

After the transfer period is complete, gold-loaded coarse carbon is separated from the slurry (boxes 22 and 23). The gold is then be recovered from this gold-loaded coarse carbon (box 24) by any suitable method including the above-discussed prior-art cyanide-leaching and electrowinning method.

A resulting slurry remaining after the above-described coarse carbon separation contains the gold-depleted fine carbon (box 26). If this is determined to contain sufficient gold to justify further recovery efforts (box 28) the inventive transfer process can be repeated following addition of further coarse carbon (box 30), and, optionally, additional transfer reagent to this residual slurry. The inventive transfer steps can be repeated until the gold content in the fine carbon is satisfactorily low. Those familiar with the art to which the present invention pertains will recognize that the number of the stages of inventive transfer of gold from fine to coarse carbon will depend on the amount of gold on the fine carbon to be transferred, the coarse carbon to fine carbon ratio, slurry temperature, and other variables. Once a slurry containing gold-depleted fine carbon has been determined to contain insufficient gold to justify further recovery cycles the slurry can be sent to discharge or for detoxification (box 30).

It should be noted that coarse carbon added at the mixing stage of the above described method is preferably "fresh", i.e., has not been previously used in a recovery process. It is, however, possible to use coarse carbon that has been used in a prior recovery operation provided that coarse carbon has a lower gold loading than the fine carbon from which gold is to be recovered. Preferably the coarse carbon gold-loading should be less than about 20% of the gold-loading of the fine carbon.

Examples of the above described method are presented in tabular form in TABLES 1, 2 and 3. In each of these examples the transfer reagent is sodium cyanide. These examples indicate how the effectiveness of the process of the present invention depends on factors such as cyanide (transfer reagent) concentration, coarse carbon to fine carbon ratio and agitation speed.

A fine carbon sample (31% carbon and 69% grit and slime) containing 17 ounces gold per ton of the carbon sample was used in these tests. Fresh coarse carbon with particle size of 2.4 mm in diameter was used. In Table 1, the coarse carbon to fine carbon ratio is 1:1 with an aqueous solution pH between 10 and 12 at an agitation speed of about 70 rpm. In Table 2, The sodium cyanide concentration is 1.0% with an aqueous solution pH of between 10 and 12 at an agitation speed of about 70 rpm. In Table 3, the coarse carbon to fine carbon ratio is 1:1, with an aqueous solution pH between 10 and 12 and cyanide concentration of 1.0%.

TABLE 1

| % Cyanide in Solution | Gold transfer from fine to coarse carbon (%) | | | | | |
| --- | --- | --- | --- | --- | --- | --- |
|  | 0.5 Hr | 1.0 Hr | 2.0 Hr | 4.0 Hr | 7.0 Hr | 24 Hr |
| 0.00 | 4 | 5 | 8 | 9 | 10 | 13 |
| 0.01 | 9 | 9 | 11 | 12 | 13 | 15 |
| 0.05 | 30 | 33 | 36 | 38 | 38 | 45 |
| 0.10 | 40 | 41 | 47 | 48 | 52 | 55 |
| 0.50 | 36 | 43 | 46 | 48 | 51 | 58 |
| 1.00 | 35 | 40 | 46 | 50 | 52 | 59 |

TABLE 2

| Coarse/fine carbon ratio | Gold transfer from fine to coarse carbon (%) | | | | | |
| --- | --- | --- | --- | --- | --- | --- |
|  | 0.5 Hr | 1.0 Hr | 2.0 Hr | 4.0 Hr | 7.0 Hr | 24 Hr |
| 1:2 | 24 | 32 | 38 | 41 | 45 | 51 |
| 1:1 | 35 | 44 | 45 | 50 | 60 | 60 |
| 2:1 | 50 | 55 | 65 | 66 | 67 | 72 |
| 5:1 | 70 | 70 | 70 | 74 | 75 | 78 |

It can be seen from TABLE 1, that increasing cyanide concentration up to about 0.10% can accelerate transfer of gold from the fine carbon to the coarse carbon. Increasing concentration beyond about 0.10%, however provide no significant increase in transfer rate. As indicated in TABLE 2, higher transfer continuously increases the higher the ratio of coarse to fine carbon.

TABLE 3

| Agitation speed (rpm) | Gold transfer from fine to coarse carbon (%) | | | | | |
| --- | --- | --- | --- | --- | --- | --- |
| | 0.5 Hr | 1.0 Hr | 2.0 Hr | 4.0 Hr | 7.0 Hr | 24 Hr |
| 100 | 38 | 41 | 51 | 52 | 61 | 63 |
| 200 | 42 | 47 | 52 | 54 | 64 | 70 |
| 300 | 44 | 51 | 53 | 55 | 66 | 70 |

As indicated in TABLE 3, an agitation speed of 300 rpm can transfer 66% of gold from the fine carbon to the coarse carbon 7 hours in a single cycle of the inventive gold recovery method. About 89% and 96% or gold can be transferred from the fine carbon in respectively second and third cycles (repetitions) of the inventive gold recovery method.

The present invention is describe above in terms of a preferred and other embodiments. The invention is not limited, however to the above-described embodiments. Rather the invention is limited only by the claims appended hereto.

What is claimed is:

1. A method for recovering gold from gold-loaded fine carbon residue from a coarse carbon gold recovery process, comprising the steps of:
   (a) mixing the gold-loaded fine carbon residue with coarse carbon and an aqueous solution of a transfer reagent to form a coarse-carbon-containing slurry;
   (b) retaining the coarse carbon in the coarse-carbon-containing slurry for a time period sufficient to transfer gold from the gold-loaded fine carbon residue to the coarse carbon, such that the coarse-carbon becomes gold-loaded and the fine carbon becomes gold-depleted;
   (c) separating the gold-loaded coarse carbon from the coarse-carbon-containing slurry thereby leaving a coarse-carbon-free slurry including gold-depleted fine carbon; and
   (d) recovering the transferred gold from the gold-loaded coarse carbon.

2. The method of claim 1 further including the steps of (e) mixing said coarse-carbon-free slurry with coarse carbon to form another coarse-carbon-containing slurry, and (f) repeating steps (b), (c) and (d).

3. The method of claim 2, wherein step (e) further includes mixing additional transfer reagent with said coarse-carbon-free slurry.

4. The method of claim 1, wherein said transfer reagent is selected from the group of reagents consisting of potassium cyanide, sodium cyanide, potassium sulfite, sodium sulfite, potassium thiosulfate, sodium thiosulfate, and thiourea.

5. The method of claim 4, wherein said transfer reagent solution includes greater than 0.01% sodium cyanide.

6. The method of claim 5, wherein said transfer reagent solution includes between about 0.1% and 0.5% sodium cyanide.

7. The method of claim 5, wherein said transfer reagent solution has a pH between about 7 and 14.

8. The method of claim 4, wherein said transfer reagent solution includes between about 0.01% to 2.0% thiourea.

9. The method of claim 8, wherein said transfer reagent solution has a pH between about 0.1 to 7.0.

10. The method of claim 4 wherein said transfer reagent solution includes one or more of sodium sulfite, potassium sulfite, sodium thiosulfate and potassium thiosulfate in an amount of 0.01% or greater.

11. The method of claim 10 wherein said transfer reagent solution has a pH of between about 1 and 13.

12. The method of claim 1 wherein in step (a) said coarse carbon is mixed with the fine carbon in a ratio of about 1:2 or greater.

13. The method claim 1, wherein during step (b) said coarse carbon is retained in said coarse-carbon-containing slurry for a period of about one-half hour or greater before executing step (c).

14. The method of claim 1, wherein during step (b) said coarse-carbon-containing slurry is continually agitated for a period of about one-half hour or greater before executing step (c).

* * * * *